(12) United States Patent
Cameron

(10) Patent No.: US 6,685,094 B2
(45) Date of Patent: *Feb. 3, 2004

(54) THERMOCHROMIC BAR CODE

(76) Inventor: Jon Cameron, 3506 Overbrook Dr., Dallas, TX (US) 75205

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 218 days.

This patent is subject to a terminal disclaimer.

(21) Appl. No.: 09/453,545

(22) Filed: Dec. 3, 1999

(65) Prior Publication Data

US 2002/0056756 A1 May 16, 2002

Related U.S. Application Data

(63) Continuation of application No. 08/986,287, filed on Dec. 6, 1997.

(51) Int. Cl.[7] ................................................. G06K 7/10
(52) U.S. Cl. .................................. 235/468; 235/462.01
(58) Field of Search ................................. 235/468, 494, 235/375, 491, 462.01, 462.07, 469, 470; 503/204; 426/61

(56) References Cited

U.S. PATENT DOCUMENTS

| | | | |
|---|---|---|---|
| 2,612,944 A | 10/1952 | Orr, Jr. | |
| 4,156,365 A | 5/1979 | Heinmets et al. | |
| 4,856,857 A * | 8/1989 | Takeuchi et al. | ............. 350/3.6 |
| 5,144,112 A * | 9/1992 | Wyatt | |
| 5,144,122 A | 9/1992 | Danley et al. | |
| 5,274,460 A * | 12/1993 | Yamada et al. | ............. 358/296 |
| 5,412,035 A | 5/1995 | Schmitt et al. | |
| 5,480,482 A | 1/1996 | Novinson | |
| 5,558,700 A | 9/1996 | Shibahashi et al. | |
| 5,622,137 A | 4/1997 | Lupton, Jr. et al. | |
| 5,673,028 A | 9/1997 | Levy | |
| 5,830,529 A | 11/1998 | Ross | |
| 5,916,841 A * | 6/1999 | Amano et al. | ............... 503/200 |
| 5,929,890 A * | 7/1999 | Kakinuma et al. | ........... 347/172 |
| 5,977,019 A * | 11/1999 | Ozeki et al. | ................. 503/204 |
| 5,997,849 A * | 12/1999 | Small et al. | ................... 424/61 |

FOREIGN PATENT DOCUMENTS

| | | | | |
|---|---|---|---|---|
| EP | 0 400 220 | * | 5/1989 | ........... B42D/15/02 |
| EP | 0 396 356 | * | 4/1990 | ........... B41M/5/30 |
| JP | 05048855 | * | 2/1993 | .............. B41J/2/32 |

OTHER PUBLICATIONS

Bar code branding ink systems, 2338 Centennial cir. GAinesville Ga. 30504 (1–770–531–0033); www.iicink.com.*

Message hiding with Dynacolor thermochromic flexographic inks. Chromatic Technologies, inc. (1–888–294–4284). www.interactivecolors.com.*

Color change Corp. 1740 Cortland Ct, Addison, II, 60101 (630–705–1000). www.colorchange.com.*

Http://www.spearing.com/predant.htm; Spear Changes Colors Down Under; News Release; 1998; Spear, Inc.

(List continued on next page.)

*Primary Examiner*—Daniel St. Cyr
(74) *Attorney, Agent, or Firm*—Mark W. Handley; Chauza & Handley, L.L.P.

(57) ABSTRACT

A bar code (10) incorporating thermochromic materials in selected modules (20) such that its code changes with temperature. Below a specified temperature, the bar code (10) displays a first code. Above this temperatures, the bar code (10) displays a second code. The bar code (10) is printed with conventional printing equipment onto conventional printing media, and is scanned with conventional bar code scanning equipment.

23 Claims, 7 Drawing Sheets

OTHER PUBLICATIONS

Http://www.spearing.com/redwolf.htm; Spear, Inc.—Red Wolf; News Release; 1998 Jun. 10; Spear, Inc.

Seideman, Tony; Bar Codes are Sweeping the Nation; Internet page; 1999 Feb 26.

Friedman, Susan; Package Printing and Converting Technology Update; Internet page; 1999 Apr. 5; North American Publishing Company.

Beirne, Mike; Checking Back In; Brandweek; 1999 Feb.; p. 18, p20–21; VNU; United States.

Httl://www.allabouterbeer.com/news/general/briefg11.html; Nov. Beer Briefs; Internet page; 1998 Nov. 8.

Http://www.spearing.com/predant.htm; Spear Changes Colors Down Under; News Release; 1998; Spear, Inc., month.

Http://www.spearing.com/redwolf.htm; Spear, Inc.—Red Wolf; News Release; 1998 Jun. 10; Spear, Inc.

Seideman, Tony; Bar Codes are Sweeping the Nation; Internet page; 1999 Feb 26.

Friedman, Susan; Package Printing and Converting Technology Update; Internet page; 1999 Apr. 5; North American Publishing Company.

Beirne, Mike; Checking Back In; Brandweek; 1999 Feb.; p. 18, p20–21; VNU; United States.

Httl://www.allabouterbeer.com/news/general/briefg11.html; Nov. Beer Briefs; Internet page; 1998 Nov. 8.

Translation of portions of above–cited Japanese patent JP 05058855, filed Feb. 26, 1993.

* cited by examiner

THERMOCHROMIC BAR CODE

CROSS-REFERENCE TO RELATED APPLICATION

The present application is a continuation application of and claims priority to application Ser. No. 08/986,287, filed Dec. 6, 1997, entitled THERMOCHROMIC BAR CODE, and invented by Jon Cameron, inventor of the present application.

BACKGROUND

1. Field of the Invention

This invention relates to bar codes, specifically to identifying the bar code's temperature range.

2. Discussion of Prior Art

Universal Product Code and Bar Code

The Universal Product Code (UPC) bar code was originally introduced in 1971, Uniform Code Council Internet publication at www.uc-council.org/ucchp.htm, to provide an efficient method of matching a product against a pricing file and recording a sale. When the bar codes were scanned at cash registers, the resultant transaction data was stored electronically. By using this transaction data, businesses could track their products' sales and then market them accordingly. Prior bar code designs also include the European Article Number (EAN) and Japanese Article Number (JAN).

These bar codes all fail to resolve the need for tracking environmental conditions such as location and temperature. When the UPC was introduced in 1971, its scope was to communicate basic information from a main product file to an on-line transaction file. Storing the resultant transactional detail produced unmanageable file sizes. Computer systems of this generation were unable to store and process large transactional databases. These computer systems were unable to manage historical databases with only several fields data, making larger information gathering needs impracticable. Therefore, current applications of the UPC bar code data are limited by its original intention of only limited information retrieval.

Today, data from bar codes are now used by store-planning software to plot packaged goods products within a store. However, store-planning software was not invented until 1979. As space planners became sophisticated in their skill, it became apparent that UPC transaction data could identify product, price, and promotion but not absolute position. Product, price, promotion and position are called the Four P's of Marketing and traditionally comprise the basic information about a product.

Certain items, such as soda, bottled water, juice, beer, and margarine can have two separate, simultaneous locations within a retail store. For example, beer can be located within a storage cooler and an adjacent floor display. To correctly plan supply, orders, and marketing, it is necessary to know from which of the two locations a particular product was sold. At present, marketers have to guess at pertinent questions:

How much did I sell from my normal selling space?

How much did I sell from the display?

How did this display effect the product's promotion?

Thermochromic Materials

Thermochromic materials are substances which emit different colors at associated temperature ranges. Thermochromics have been used as active components in temperature-specification devices, as shown in U.S. Pat. No. 4,156,365 to Heinmets et al (1979), U.S. Pat. No. 5,144,112 to Wyatt et al. (1992), and U.S. Pat. No. 5,622,137 to Lupton, Jr. et al. (1997). Each of these patents requires a human operator to visually identify the material's color and estimate its temperature accordingly. These inventions do not account for the different color-perception capabilities, or lack of color perception, among the general population.

Some thermochromic materials exhibit a one-time, permanent (quondam) change in color, as the one demonstrated in U.S. Pat. No. 5,622,137 to Lupton, Jr. et al. (1997), while other thermochromics are reversible, as shown in U.S. Pat. No. 5,558,700 to Shibahashi et al. (1996), and U.S. Pat. No. 5,480,482 to Novinson (1996).

OBJECTS AND ADVANTAGES

Accordingly, the object of this invention is to provide an accurate method of establishing the temperature range of a product to which a bar code is attached. Several other objects and advantages of the present invention are:

(a) to provide a bar code that requires no hardware modifications of bar code readers;

(b) to provide a bar code that can establish a historical temperature range that marks product as unsalable;

(c) to provide a bar code that can be printed using current package printing technologies;

(d) to provide a bar code that will not significantly increase the price of the packaging;

(e) to provide a bar code that identifies the position from where the product was selected when the product has multiple locations;

(f) to provide a bar code that can contain two different codes;

(g) to provide a bar code that allows the temperature differences among a set, sample, or population of items to be efficiently identified.

DRAWING FIGURES

FIG. 2-A shows a thermochromic UPC bar code at standard room temperature.

FIG. 2-B shows the same UPC bar code from FIG. 2 when stored below 65 degrees F.

FIG. 4-A shows an exploded view of the bar code from FIG. 2.

FIG. 4-B shows an exploded view of the bar code from FIG. 3.

LIST OF REFERENCE NUMERALS

10 Barcode
20 Module
30 Digit
40 Check Digit
50 Numeric Character
60 UPC Version A Bar code
70 Numeric Character Set
80 Thermochromic Digit
90 Light Module
100 Dark Module

110 Thermochromic Module
120 Null Bar code
130 Thermochromic Bar code

SUMMARY

The purpose of this invention is to provide a method of determining an item's temperature range when its bar code is scanned. This is accomplished by printing its bar code with thermochromic material(s) such that two separate codes are stored on the same bar code and such that each code is exclusively visible within a specific temperature range.

Description—FIGS. 1 to 5

Figure 1:
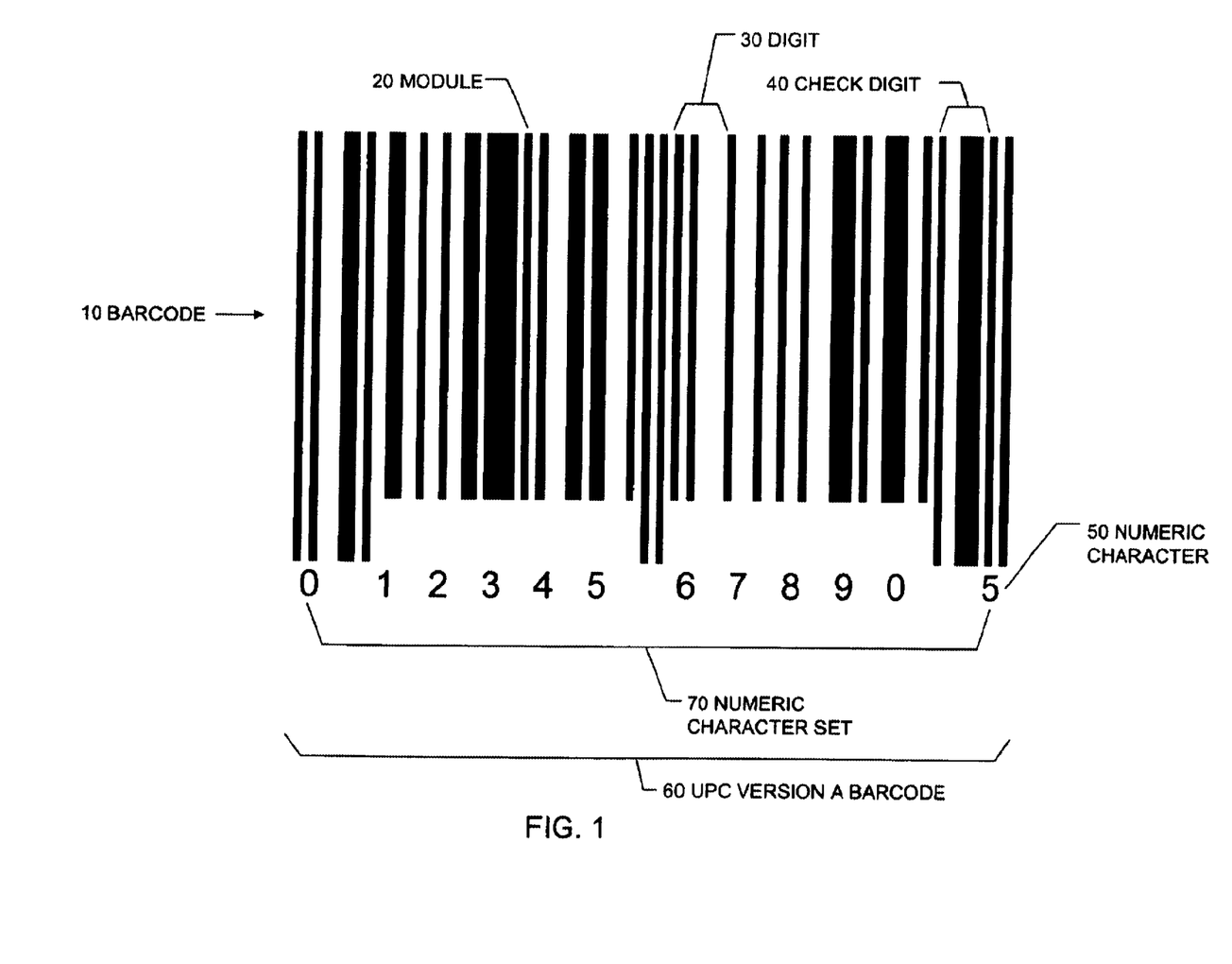
FIG. 1 shows an example of a UPC bar code.

An example bar code 10 shown in FIG. 1 is a UPC Version A bar code 60. Within bar code 10 is a series of parallel dark lines and light spaces of varying thickness which represent a numeric combination. Below bar code 10 is a numeric character set 70 which translates bar code 10. A digit 30 is a unit of barcode 10 consisting of two dark bars and two light spaces. FIG. 1 illustrates bar code 10 with twelve digits 30. A module 20 is the smallest defined space in bar code 10. There are seven modules 20 per digit 30. Each digit 30 of bar code 10 is represented by a numeric character 50 located directly below digit 30. A check digit 40 is used to verify barcode 10.

Figure 3:
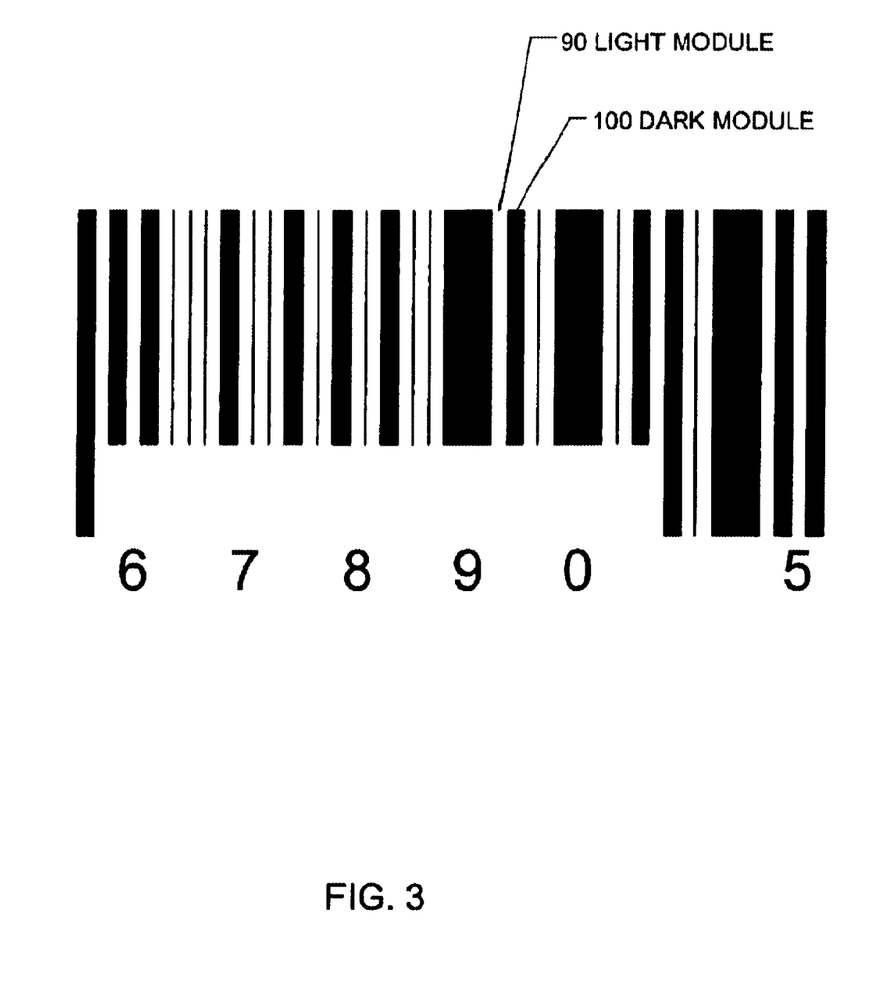
FIG. 3 shows an exploded view of the bar code from FIG. 1.
Figure 4:
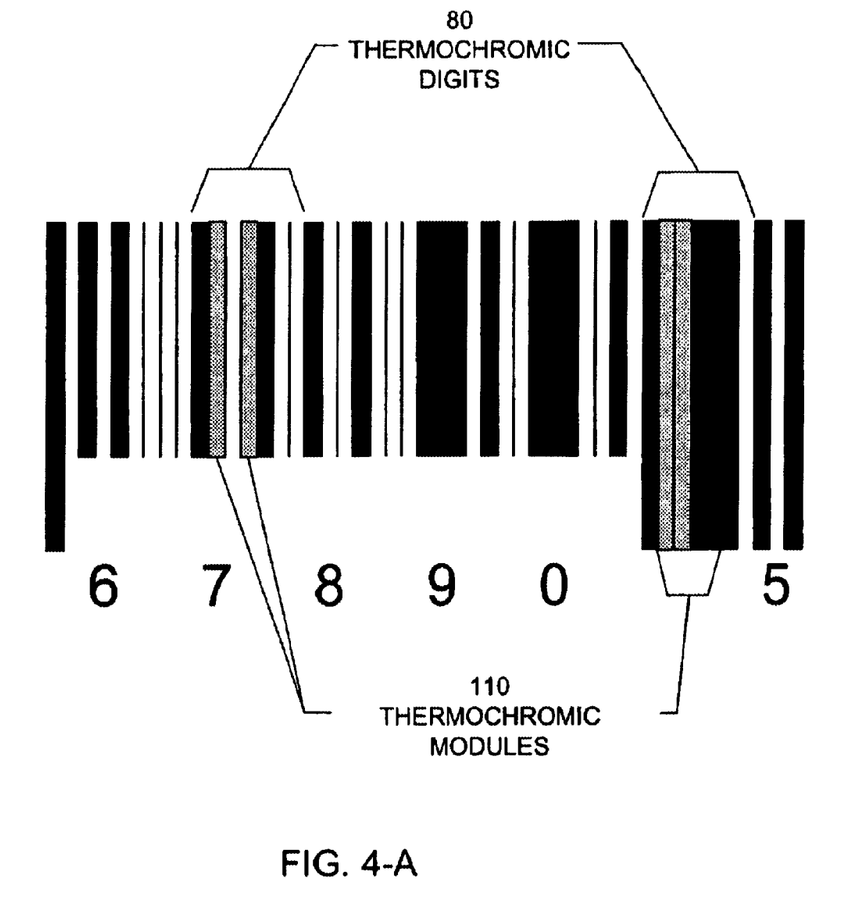

Each digit 30 is represented by seven modules 20. A light module 90 and a dark module 100 are shown in FIG. 3. Each unique digit 30 is constructed of a set of light modules 90 (FIG. 3.) and dark modules 100. The arrangement of modules 20 (FIG. 1) creates the visual appearance of a series of dark lines and light spaces within bar code 10.

Figure 2:
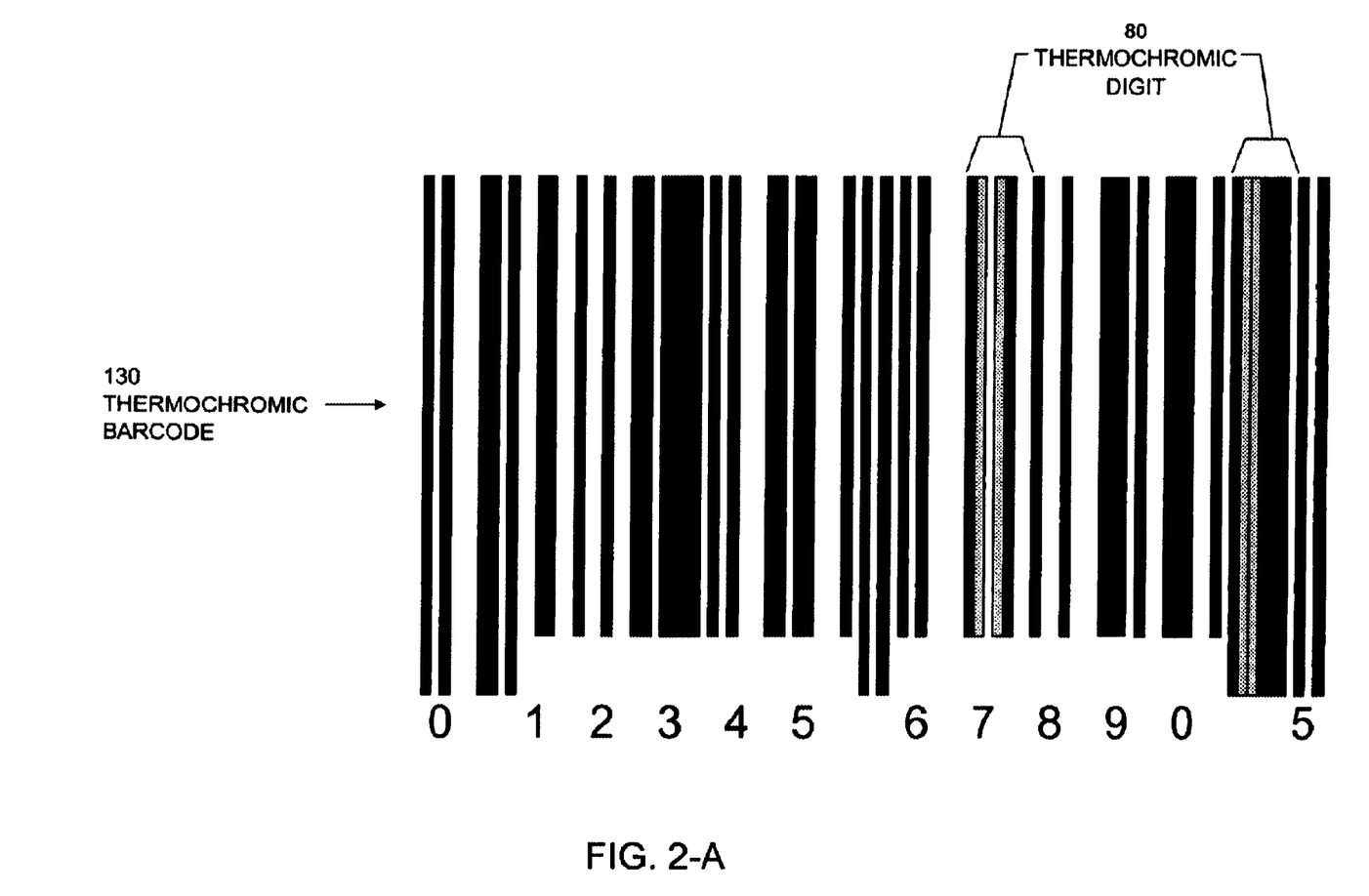
Figure 5:
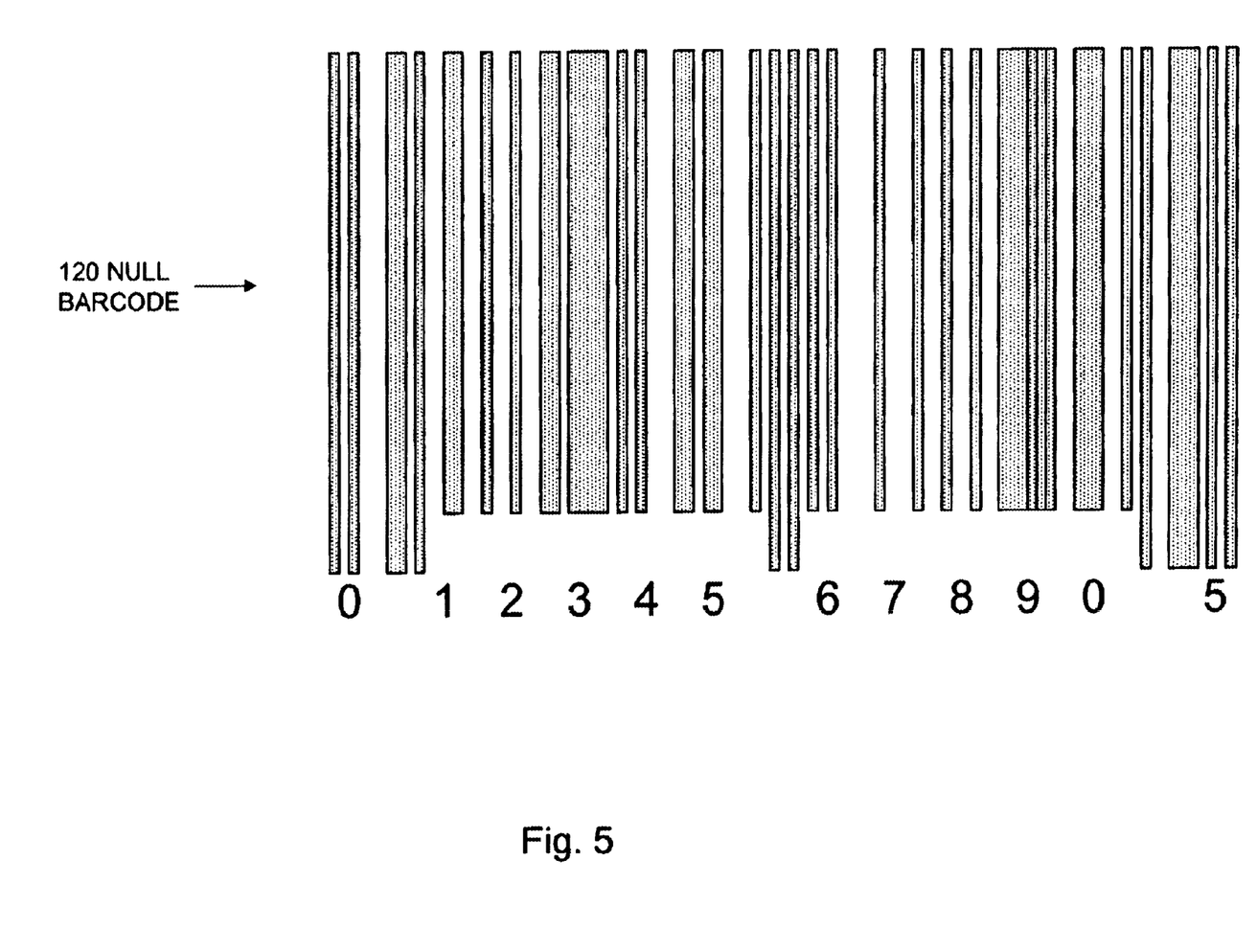
FIG. 5 shows an example of a null UPC bar code.

A typical embodiment of the present invention is illustrated in FIGS. 2-A and 2-B. A thermochromic bar code 130 (FIGS. 2-A and 2-B) incorporates thermochromic materials into modules 20 of one of its digits 30 and its check digit 40. Thermochromic materials, including inks, are materials which display different colors at different temperature ranges. For example, a single ink made of thermochromic materials can be black at one temperature range and transparent at another temperature range. A thermochromic module 110 (FIGS. 4-A and 4-B) is printed with thermochromic materials. A thermochromic digit 80 (FIGS. 2-A and 2-B) is comprised of thermochromic modules 110 (FIGS. 4-A and 4-B) instead of standard ink modules 20 (FIG. 1). An example of a null barcode 120 is shown in FIG. 5. Null barcode 120 (FIG. 5) incorporates thermochromic materials into all of its digits 30.

From the description above, a number of advantages of the thermochromic bar code become evident:

The thermochromic bar code provides the ability to print two bar codes within the space of a single bar code. A secondary bar code can replace a base bar code when the desired temperature range in achieved.

The thermochromic bar code can be printed using normal packaging printing technology without significantly increasing printing costs.

The thermochromic bar code requires no hardware modifications of bar code readers.

The thermochromic bar code allows several new functional uses of a bar code. For example, it can establish and maintain a previous temperature range which then can be used to record a environmental event in the bar code's history. This functionality can used practically to determine if a product, such as meat, has reach a dangerous temperature range. It can also can be used to establish temperature differences in a group of items. The most apparent commercial use is its attachment to a retail product that has both hot and cold locations within a store. This will allow businesses in the supply chain to identify from which location the product was actually sold. cl Operation—FIGS. 1 to 5

Thermochromic bar code 130 (FIGS. 2-A and 2-B) can be printed using current standard printing technology. It can be scanned by any bar code reader (not shown). A bar code reader is a device which can optically scan bar code 10 (FIG. 1) and translate its code into electrical signals.

The purpose of this invention is to incorporate two separate bar codes 10 (FIG. 1) within the space of one bar code 10 (FIG. 1) such that each code is exclusively visible at a specific temperature range. One possible method of printing thermochromic bar code 130, as shown in FIGS. 2-A and 2-B, is to first print bar code 10 (FIG. 1) in standard ink, then print overlapping module(s) 20 (FIG. 1) with thermochromic material. The thermochromic materials used are only visible at a certain temperature range. When the temperature of thermochromic bar code 130 is not within this range, it appears as FIG. 2-A. When the temperature of thermochromic bar code 130 is within this range, thermochromic modules 110 (FIGS. 4-A and 4-B) will become visible and display thermochromic bar code 130 as seen in FIG. 2-B. This method allows for two or more separate bar codes 10 to be printed in the same area of a single bar code 10.

Depending on the type of thermochromic materials used, the thermochromic bar code could have different uses:

To identify product position within a store, the thermochromic materials used will be able to convert repeatedly from visible to invisible, as shown in FIGS. 2-A and 2-B, depending on the product's current temperature.

To identify a product's temperature history or to determine whether a product has been exposed to undesirable thermal conditions, the bar code would be created with thermochromic materials that transform permanently into a null bar code. The null bar code shown in FIG. 5 is one in which no distinction between dark modules and light modules can be made by scanning equipment. An example of said null bar code would be an area of solid black or solid white.

Sources of Supply

The following companies are suppliers of thermochromic materials and dyes:

CHROMATIC TECHNOLOGIES INCORPORATED, Ithaca, N.Y.
SPEAR U.S.A., Mason, Ohio
FLINT INK CORPORATION, Dallas, Tex.
MCK CONSULTING INC., Mississauga, Ontario

CONCLUSION, RAMIFICATIONS AND SCOPE OF INVENTION

The thermochromic bar code described here will provide suppliers and retailers a reliable method of determining whether a product sold came from a refrigerator or a shelf. This is accomplished by using the thermochromic properties of an ink to imbed a second bar code within a primary bar code. This relatively inexpensive process of identifying product will require minimum hardware and software modification of enterprises in the supply chain.

Although the description above contains many reference to the UPC bar code, this invention is not limited to the UPC.

It can be used for EAN, JAN, and any other bar code for which the use of this process is desired. This thermochromic bar code could also be useful as an efficient method of identifying temperature differences among a set, sample, or population of items.

Similarly, an entire thermochromic bar code could be attached to a product that must be maintained below a certain temperature range. If the temperature exceeds the desirable range, the bar code would disappear, either partially or wholly. For example, assume milk must be kept below 52 degrees Fahrenheit. Exposure above that temperature range causes the quality of the product to degrade. If the carton exceeds the safety temperature, the UPC code would permanently vanish making the product unsalable.

Accordingly, the scope of this invention should be determined not by the embodiment illustrated, but by the appended claims and their legal equivalent.

What is claimed is:

1. A method of producing a bar code, comprising the steps of:
    printing bar code modules in a bar code space to define a bar code;
    wherein the step of printing the bar code modules includes printing at least one bar code module with a thermochromic material; and then
    later optically scanning the bar code to detect whether a change has occurred in the thermochromic material of the at least one bar code module after the step of printing the bar code modules to thereby determine a storage temperature history of the bar code.

2. The method of producing a bar code of claim 1, wherein the step of printing further comprises:
    printing the bar code module entirely with a quondam thermochromic material to define a revocable bar code wherein the bar code can be rendered permanently invisible in response to exposure to temperatures of the storage temperature history to warn a bar code reader of an existing or historically undesirable environmental condition.

3. The method of producing a bar code of claim 1, wherein the step of printing further comprises:
    printing at least a second bar code module with at least a second thermochromic material to produce the bar code;
    wherein the thermochromic material and the second thermochormic material responds to separate, respective temperature ranges; and
    wherein the bar code can display a plurality of predetermined codes, including a null code, in order to measure a series of temperature variations to which the bar code has been subjected after the step of printing.

4. The method of claim 1, wherein the step of later optically scanning comprises the step of scanning the bar code with a bar code reader.

5. The method of claim 4, wherein said step of printing comprises including a plurality of codes which are incorporated into the bar code according to response of the thermochromic material to possible temperatures of the storage temperature history to which the bar cade is exposed after the step of printing.

6. The method of claim 1, wherein said step of printing comprises including a plurality of codes which are incorporated into the bar code according to response of the thermochromic material to possible temperatures of the storage temperature history to which the bar cade is exposed after the step of printing.

7. A bar code, comprising:
    a first bar code portion produced in a bar code space;
    a second bar code portion produced with a first thermochromic material; and
    wherein said first thermochromic material will change appearance in response to historical temperature conditions to which said first thermochromic material is exposed after printing of said produced bar code, whereby existing or historical temperature conditions of said bar code can be determined when said bar code is scanned by a bar code reader, and whereby a plurality of codes can be incorporated into a single produced bar code.

8. A bar code as claimed in claim 7, further comprising a further bar code portion produced with a second thermochromic material wherein said first thermochromic material and said second thermochromic material respond to different respective temperature ranges.

9. The bar code of claim 7, wherein said second bar code portions comprises:
    a revocable bar code portion produced entirely with a quondam thermochromic material, and
    whereby said revocable bar code portion can be rendered permanently invisible to notify of an existing or historically environmental condition in an automated fashion.

10. A bar code comprising:
    a bar code portion produced with a first thermochromic material, and
    at least one additional bar code portion produced with a second thermochromic material,
    wherein each of the first and second thermochromic materials responds to separate, respective temperature ranges; and
    wherein said bar code can simultaneously display a plurality of predetermined codes, including a null code in order to indicate during a single bar code read, temperature variations to which said bar code has been exposed after said bar code was produced.

11. A bar code printed in a bar code space, said bar code comprising:
    a plurality of digit regions disposed in the bar code space, in a preselected spacial relation;
    one of said digit regions having a temperature module which is disposed in a distinct relative relation within said preselected spacial relation of said plurality of digit regions;
    said temperature module having a thermochromic material disposed therein, wherein said thermochromic material is defined such that a color characteristic thereof is responsive to exposure to ambient temperatures relative a predetermined temperature value; and
    wherein exposure of the bar code space to the ambient temperatures relative to the predetermined value changes a temperature of said thermochromic material of said temperature module relative to the predetermined temperature value, such that said color characteristic is changed in response to the temperature which changes a value for said temperature module and said digit to enable determining exposure of said bar code, after said bar code is produced, to the temperature by means of a bar code scanner.

12. The bar code of claim 11, wherein said thermochromic material is of a type which undergoes a permanent change in said color characteristic in response to changes in the temperature relative to the predetermined temperature value, after the bar code is produced.

13. The bar code of claim 11, wherein said thermochormic material and said bar code together comprise a second bar code printed in the bar code space initially occupied by said bar code, with said second bar code appearing in response to changes in ambient temperature to which said thermochromic material is exposed after said bar code is produced.

14. A method of monitoring environmental conditions of a product during a selected time duration, comprising the steps of:
   providing a thermochromic material which in response to exposure to a selected one of the environmental conditions will change state;
   including a marking of the thermochromic material in a bar code associated with the product, in a substantially fixed relational proximity to the product for the selected time duration; and then, after expiration of the selected time duration,
   optically scanning the marking to determine the state of the thermochromic material and identify whether the product has been exposed to the selected one of the environmental conditions.

15. The method of claim 14, wherein the step of providing comprises providing a thermochromic material which is of a quondom type, such that exposure to the selected one of the environmental conditions results in a permanent change in the state of the thermochromic material.

16. The method of claim 15, wherein the bar code is printed entirely of the thermochromic material, such that the bar code is rendered permanently illegible when exposed to the selected environmental condition.

17. The method of claim 14, wherein the step of providing comprises providing a thermochromic material which is of a type other than a quondom type, such that exposure to the selected one of the environmental conditions results in a reversible change in the state of the thermochromic material.

18. The method of claim 17, wherein a second marking of a quondom type of thermochromic material is included as a second marking in the bar code which is associated with the product, such that exposure to one of the environmental conditions results in a permanent change in the state of the thermochromic material of the second marking.

19. The method of claim 14, wherein a second marking of a quondom type of thermochromic material is included as a second marking in the bar code which is associated with the product, such that exposure to one of the environmental conditions results in a permanent change in the state of the thermochromic material of the second marking.

20. The method of claim 14, wherein the selected environmental condition is exposure to a selected temperature which is outside of a desired temperature range for the product.

21. The method of claim 20, wherein the desired temperature range for the product corresponds to a positional location for the product in a facility.

22. The method of claim 21, wherein the selected time duration is selected to correspond to a time duration running from when the marking of thermochromic material is associated with the product until removal of the product from the facility.

23. The method of claim 22, wherein a second marking of a quondom type of thermochromic material is included as a second marking in the bar code which is associated with the product, such that exposure to one of the environmental conditions results in a permanent change in the state of the thermochromic material of the second marking.

* * * * *

UNITED STATES PATENT AND TRADEMARK OFFICE
CERTIFICATE OF CORRECTION

| | | |
|---|---|---|
| PATENT NO. | : 6,685,094 B2 | Page 1 of 1 |
| APPLICATION NO. | : 09/453545 | |
| DATED | : February 3, 2004 | |
| INVENTOR(S) | : Jon Cameron and Tobin A. Gaedke | |

It is certified that error appears in the above-identified patent and that said Letters Patent is hereby corrected as shown below:

Title page,
Item [12], "Cameron" should read -- Cameron et al. --.
Item [76], Inventors, "Jon Cameron, 3506 Overbrook Dr., Dallas, TX (US) 75205" should read -- Jon Cameron, 3506 Overbrook Dr., Dallas, TX (US) 75205; Tobin A. Gaedke, 4938 Lahoma St., Dallas, TX (US) 75235 --.

Signed and Sealed this

Twenty-seventh Day of June, 2006

JON W. DUDAS
*Director of the United States Patent and Trademark Office*